United States Patent Office.

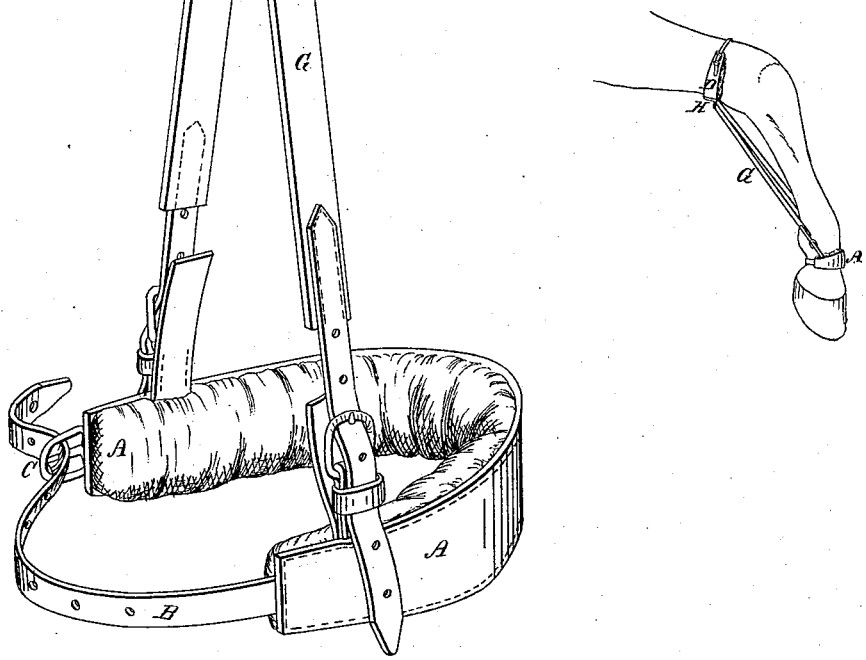

WILLIAM M. GREENWOOD, OF CINCINNATI, OHIO.

Letters Patent No. 67,042, dated July 23, 1867.

---

IMPROVED TRAINING-HOPPLE.

---

The Schedule referred to in these Letters Patent and making part of the same.

---

TO ALL WHOM IT MAY CONCERN:

Be it known that I, WILLIAM M. GREENWOOD, of Cincinnati, in the county of Hamilton, and State of Ohio, have invented a new and useful Hopple for Training Horses; and I do hereby declare the following to be a full, clear, and exact description of the same, reference being had to the accompanying drawings, which are made part of this specification.

This invention consists in a device for improving the gait of horses, and is especially designed to correct the tendency possessed by some fast-travelling animals to reach unduly forward or "point" with their fore feet in trotting, thereby consuming time by a too prolonged elevation of the leg or foot.

Figure 1 is a perspective view of a hopple embodying my invention.

Figure 2 shows the same applied to a horse's leg.

A is a pad adapted to be secured below the pastern by means of a strap, B, and buckle, C. D is a pad adapted to be secured above the knee by means of a strap, E, and buckle, F. G is an elastic band of shirred rubber goods, which, being rove through a staple, H, on the pad D, is attached, by its lower extremities, to opposite sides of the pad A in the manner shown. Fig. 2 represents the application of the hopple to the fore leg of a "pointing" horse. It will be seen that an effort on the part of the horse to "point" or throw his foot too far forward is instantly checked by the elastic band, and he is thereby compelled to drop his foot, obliging him to take a quicker step and to gather up the ground with greater rapidity.

This device accomplishes in a few weeks what usually takes several years with the customary "rattles" and shot-bags.

This appliance being made on the front of the leg, is also available for correcting too much knee action and imparting length to the gait; or by applying it to the side of the leg it will effectually cure a tendency to "interfere" or the striking of one leg by the hoof of the other. The device is also applicable to the hind leg.

What I claim as new, and desire to secure by Letters Patent, is—

The arrangement of pads A and D, straps and buckles B C E F, and elastic band G, as and for the purpose set forth.

In testimony of which invention I hereunto set my hand.

W. M. GREENWOOD.

Witnesses:
GEO. H. KNIGHT,
JAMES H. LAYMAN.